United States Patent
Bales et al.

(10) Patent No.: US 11,933,596 B1
(45) Date of Patent: Mar. 19, 2024

(54) EXPLOSIVES ORDNANCE DISPOSAL APPARATUS AND METHOD

(71) Applicant: Government of the United States, as represented by the Secretary of the Air Force, Wright-Patterson AFB, OH (US)

(72) Inventors: John Bales, Beavercreek, OH (US); Alexander Orsi, Dayton, OH (US); James Okeefe, Kettering, OH (US); Kyle Schory, Dayton, OH (US); Stuart Baker, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 225 days.

(21) Appl. No.: 17/488,467

(22) Filed: Sep. 29, 2021

Related U.S. Application Data

(60) Provisional application No. 63/135,912, filed on Jan. 11, 2021.

(51) Int. Cl.
*F42D 5/04* (2006.01)
*G01N 23/04* (2018.01)

(52) U.S. Cl.
CPC ............... *F42D 5/04* (2013.01); *G01N 23/04* (2013.01)

(58) Field of Classification Search
CPC . F42D 5/04; G01N 23/04; F42B 33/06; F42B 33/062; F42B 33/065; F41H 11/12
See application file for complete search history.

(56) References Cited

U.S. PATENT DOCUMENTS

| | | | | |
|---|---|---|---|---|
| 5,668,342 A | * | 9/1997 | Discher | F42D 5/04 102/293 |
| 5,743,246 A | * | 4/1998 | Mattern | F41B 9/0015 124/71 |
| 8,532,823 B2 | | 9/2013 | McElroy et al. | |
| 2006/0037462 A1 | * | 2/2006 | Marcolla | F41H 11/14 89/1.13 |
| 2012/0221144 A1 | * | 8/2012 | McElroy | F42D 5/04 901/14 |
| 2014/0245880 A1 | * | 9/2014 | Rabec Le Gloahec | F42B 33/065 89/1.13 |

\* cited by examiner

*Primary Examiner* — Joshua E Freeman
(74) *Attorney, Agent, or Firm* — AFMCLO/JAZ; Jeffrey V. Bamber

(57) ABSTRACT

A device and method for remote-controlled explosive ordnance disposal using an explosive ordnance disposal device that includes a carriage adjustably attached to a device frame having a rotatable bar. The rotatable bar including at least a laser face, an x-ray face, and a disarm device face; the rotatable bar rotated by a servo motor, the servomotor being remotely operable. The laser face having a laser capable of a laser beam visible to a remote viewing device. The remote viewing device co-mounted to the laser face and remotely viewable. The x-ray face having an x-ray device attached to it. The disarm device face having a bomb disarming device attached; wherein the carriage and the rotatable bar may be remotely adjusted such that upon remote rotation the laser, x-ray and bomb disarming device share an aligned orientation and placement for operation.

6 Claims, 2 Drawing Sheets

EXPLOSIVES ORDNANCE DISPOSAL APPARATUS AND METHOD

PRIORITY

Pursuant to 37 C.F.R. § 1.78(a)(4), this application claims the benefit of and priority to Provisional Application Ser. No. 63/135,912, filed Jan. 11, 2021 which is expressly incorporated herein by reference.

STATEMENT OF GOVERNMENT INTEREST

The invention described herein may be manufactured, used, and licensed by or for the Government of the United States for all governmental purposes without the payment of any royalty.

BACKGROUND

Disclosed herein is a major improvement in explosive ordnance disposal, making the procedure less dangerous to operators. Every second adjusting a tripod or swapping components is another second standing next to a suspected explosive device. While robot systems exist, the present design is less expensive and much easier to train an operator on. It is also more flexible in terms of usability and "man-packable."

The current process for the explosive ordnance disposal teams to analyze and disarm a device involves a very cumbersome series of events encompassing manual work that is very difficult to perform in a bomb suit. This can lead to up to 45 minutes of exposure for an operator to get the x ray device and tripod set up and aimed.

The invention allows remote operation of the Percussion Activated Non-electric (PAN) disrupter system used to disrupt or disable suspected explosive devices. With known devices, a user has to mount the X ray device, take an X ray, retrieve the film, mount the disruptor barrel with an in- or over-barrel laser sight, aim the barrel using manual controls, remove the laser sight, retreat a safe distance, and fire the disruptor. Using the circular mount, upon command the servo motor rotates the mount through the various operations, keeping them directly in line with each upon rotation to the main position.

SUMMARY OF INVENTION

The present invention includes a remote-controlled bomb disarming device and method for using same. The remote-controlled explosive ordnance disposal device may include a carriage adjustably attached to a device frame having a rotatable bar. The rotatable bar including at least a laser face, an x-ray face, and a disarm device face; the rotatable bar rotated by a servo motor, the servomotor being remotely operable. The laser face having a laser capable of a laser beam visible to a remote viewing device, the remote viewing device co-mounted to the laser face and remotely viewable. The x-ray face having an x-ray device attached. The disarm device face having a bomb disarming device attached. The carriage and the rotatable bar may be remotely adjusted such that upon remote rotation the laser, x-ray and bomb disarming device share an aligned orientation and placement for sequential operation. The remote operability and remote viewability is provided by a disarming device controller.

The carriage may further include a front adjustable arm having at least one adjustable joint, a first back adjustable arm having at least one first back adjustable joint and a second back adjustable arm having at least on second back adjustable arm adjustable joint, and in one embodiment the carriage may include an attach point for a tripod.

The bomb disarming device is a disruptor that may be fired remotely using the disarming device controller.

A method of using the remote-controlled explosive ordnance disposal device by orienting the x-ray device to the top of the rotatable bar and manipulating the carriage to adjust the pitch and yaw of the device frame so as to aim the x-ray device at a suspected explosive device. Then taking an x-ray and analysis the x-ray to assess the EOD device orientation for disarming the explosive device and adjusting the EOD device orientation as needed. Then rotating the rotatable bar such that the laser is on top of the device and using a video feed from the remote viewing device to aim the laser at a specific target as assessed by the x-ray. Then rotating the rotatable bar so that the bomb disarming device is on top in such a way as to align the bomb disarming device to wherever the laser previously pointed, and activating the bomb disarming device to dispose of the explosive ordnance.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
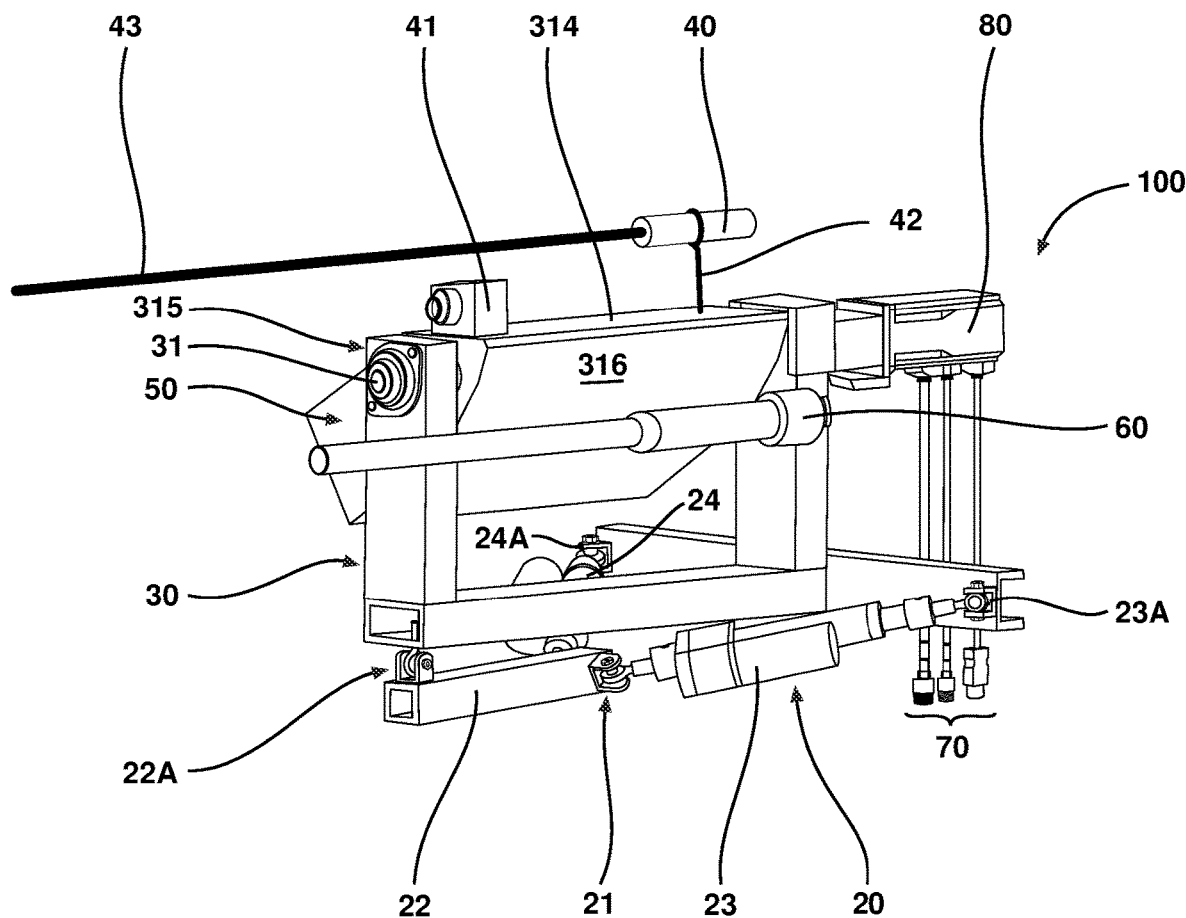
FIG. 1 is an illustration of an Explosive Ordinance Disposal (EOD) device.

The present invention is illustrated in FIG. 1 shows a remote-controlled Explosive Ordinance Disposal (EOD) device 100. Disposal includes actions such as disarming, disabling, diminishing ordnance capabilities or otherwise limiting the effects of ordnance which may either intentionally or unintentionally left in a hazardous configuration. The EOD device 100 may include a carriage 20. The carriage 20 may include an attach point 21 which may be used to attaching the EOD 100 to a tripod, a ground vehicle, or any other platform known in the art.

The carriage 20 may further be supported by a front adjustable arm 22 having a front adjustable joint 22A, a first back adjustable arm 23 having a first back adjustable joint 23A and a second back adjustable arm 24 also having a second back adjustable joint 24A.

A device frame 30 may be supported by the carriage 20, the device frame 30 may include a rotatable bar 31 having at least three faces. The three faces of the bar may include a laser face 314, an x-ray face 315 and a disarm device face 316. Attached to the laser face 314 by a laser mount 42 may be a laser 40 capable of producing a laser beam 43 and in one embodiment, a remote viewing device 41, such as a camera capable of viewing the laser beam 43.

Attached to the x-ray face 315 may be an x-ray device 50. Attached to the disarm device face 316 may be a bomb disarming device 60. The rotation and control of the a rotatable bar 31 and operation of the laser 40, the remote viewing device 41, the x-ray device 50 and the bomb disarming device 60 may be powered and operated by disarming device controller connections for use and power and a servomotor 80 may be used to rotate the rotatable bar 31. Connections 70 allow for remote operation & control. In alternate embodiments the power may be self-contained and the EOD device 100 controlled by radio signal, or any other remote control known in the art. The EOD device 100 negates the need to obstruct the barrel of the disruptor with laser sight and keeps operator exposure to a potential explosive device to a minimum.

The servo motor 80 is used to rotate the rotatable bar 31 so as to allow the different components to be orientated on the top to be used. The rotating system can switch between the components of the system and the adjustable pitch and yaw allows for aiming the laser at the correct location and alignment for use as it is rotated about the fixed carriage 20 location. This allows for remote use of the system where the laser 40, viewer 41, x-ray 50, and bomb disposal devise 60 may all be mounted on their respective rotatable bar 31 faces such that the laser beam 43 and viewing device 41, and x-ray 50, all line up with an aim point of the bomb disarming device 60 to ensure precise use of all three components within the system.

In one embodiment as shown in FIG. 1 the device frame 30 may be shaped like a "T" where the legs of the T serve as locations to mount linear actuators as a front adjustable joint 22A, a first back adjustable joint 23A and a second back adjustable joint 24A. An alternative configuration may include using two more servo motors instead of the linear actuators to control pitch and yaw. Any material of sufficient strength can be used in place of aluminum. In one embodiment the attach point 21 may be designed to attach to a tri-pod (not shown) or a mobile unmanned ground vehicle (not shown).

Figure 2A:
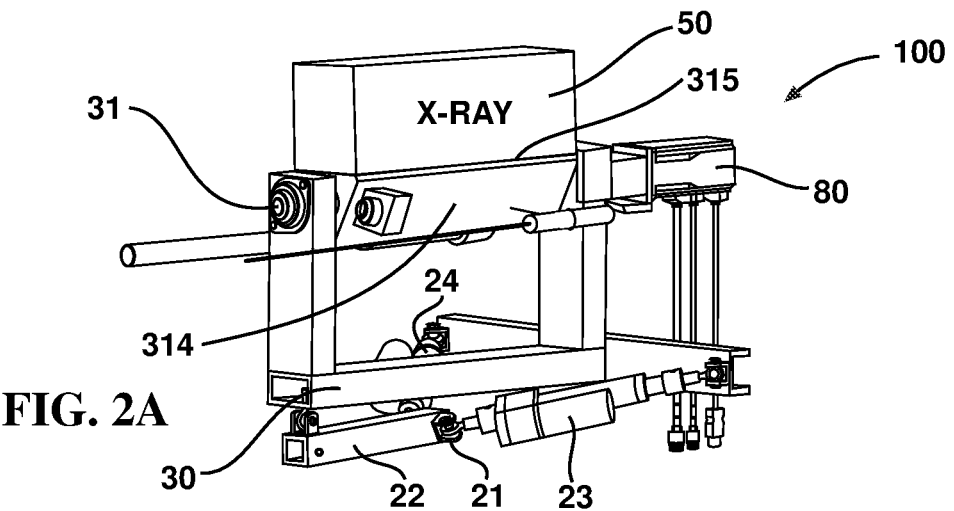
FIG. 2A is an illustration of the Explosive Ordinance Disposal (EOD) device in the x-ray configuration embodiment.

The method of operation includes having the x-ray device 50 on the top of the rotatable bar 31 at the x-ray face 315 as shown in FIG. 2A, and a remote control would allow a user to manipulate the carriage 20 adjustable arms (22, 23, 24) to adjust the pitch and yaw of the device frame 30 prism so as to aim the x-ray device 50 as desired at a suspected explosive device (not shown). Once an x-ray is taken, the user may analyze a digital x ray to assess if the EOD device 100 in in a proper orientation for disarming the explosive. Once a target is identified on the x ray, the rotatable bar 31 may be rotated by the servo motor 80 so the laser 40 is on top of laser face 315.

Figure 2B:
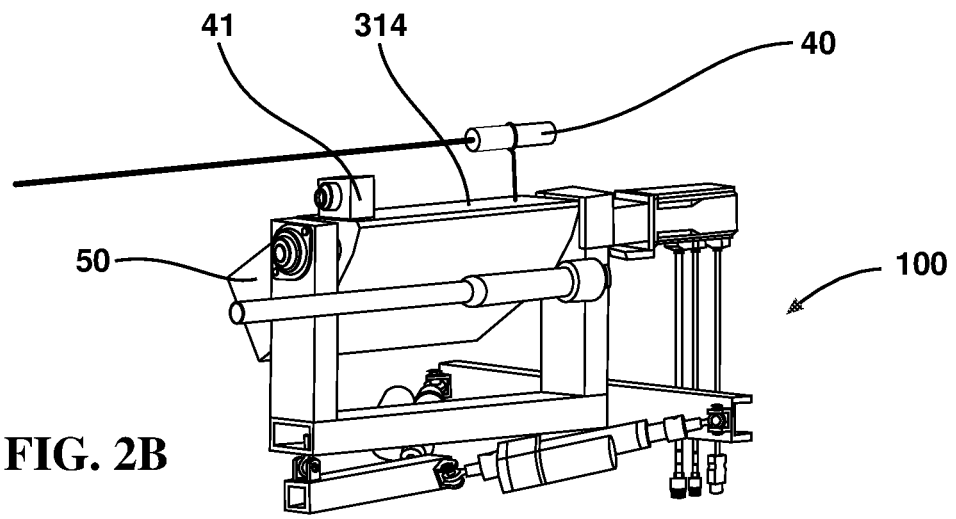
FIG. 2B is an illustration of the Explosive Ordinance Disposal (EOD) device in a laser/camera configuration.
Figure 2C:
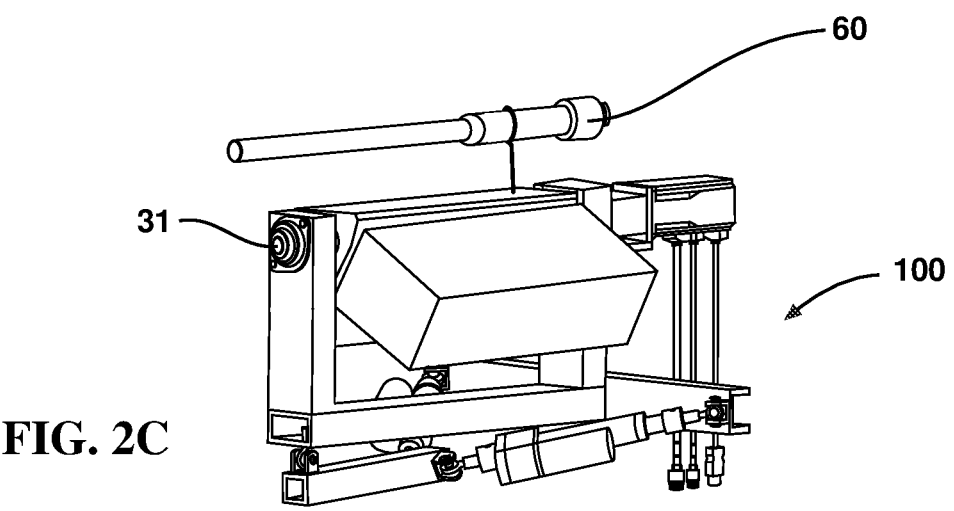
FIG. 2C is an illustration of the Explosive Ordinance Disposal (EOD) device in a disarm device configuration.

As shown in FIG. 2B, the x-ray device 50 is rotated out of the way and the user then uses a video feed from the remote viewing device 41 to aim the laser at a specific target as assessed by the x-ray taken by the x-ray device 50. Once the laser 40 is aimed correctly, the servo motor is again used to rotate the rotatable bar 31 so that the bomb disarming device 60 is on top as shown in FIG. 2C. The laser 40 is mounted in such a way as to align with the bomb disarming device 60 such that wherever the laser 40 is aimed, when the bomb disarming device 60 is on top it is in the same orientation in operation and the bomb disarming device 60 when the bomb disarming device 60 is on top as shown in FIG. 2C. As aligned, the bomb disarming device 60 may be operated precisely to dispose of the explosive ordnance. In one embodiment the bomb disarming device 60 may be a disruptor that may be fired remotely using the disarming device controller 70. The device frame 30 and rotatable bar 31 may be made for any material known in the art. In one embodiment aluminum may be used. The rotatable bar 31 may be held with bearings at both ends and connected to the servo motor 80 through a flexible coupling. The bearings may be mounted in the device frame 30, which may be mounted to the carriage 20.

While this disclosed design is susceptible of being embodied in many different forms, there is shown in the drawings and will herein be described in detail specific embodiments, with the understanding that the present disclosure is to be considered as an example of the principles of the disclosed design and not intended to limit the disclosed design to the specific embodiments shown and described. In the description below, like reference numerals may be used to describe the same, similar or corresponding parts in the several views of the drawings.

It should be appreciated that the devices, systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

What is claimed is:

1. A remote-controlled explosive ordnance disposal device
including:
a carriage adjustably attached to a device frame having a rotatable bar;
   the rotatable bar including at least a laser face, an x-ray face, and a disarm device face;
the rotatable bar rotated by a servo motor, the servomotor being remotely operable;
the laser face having a laser capable of a laser beam visible to a remote viewing device, the remote viewing device co-mounted to the laser face and remotely viewable;
the x-ray face having an x-ray device attached;
the disarm device face having a bomb disarming device attached; wherein the carriage and the rotatable bar may be remotely adjusted such that upon remote rotation the laser, x-ray and bomb disarming device share an aligned orientation and placement for sequential operation.

2. The remote-controlled explosive ordnance disposal device of claim 1 wherein the carriage further includes a front adjustable arm having at least one adjustable joint, a first back adjustable arm having at least one first back adjustable joint and a second back adjustable arm having at least one second back adjustable arm adjustable joint.

3. The remote-controlled explosive ordnance disposal device of claim 2 wherein the carriage includes an attach point for a tripod.

4. The remote-controlled explosive ordnance disposal device of claim 1 wherein the remote operability and remote viewability is provided by a disarming device controller.

5. The remote-controlled explosive ordnance disposal device of claim 4 wherein the bomb disarming device is a disruptor that may be fired remotely using the disarming device controller.

6. A method of using the remote-controlled explosive ordnance disposal device of claim 1 wherein:
- orienting the x-ray device to the top of the rotatable bar;
- manipulating the carriage to adjust the pitch and yaw of the device frame so as to aim the x-ray device at a suspected explosive device;
- taking an x-ray and analyzing the x-ray to assess the EOD device orientation for disarming the explosive device and adjusting the EOD device orientation as needed;
- rotating the rotatable bar such that the laser is on top of the device and using a video feed from the remote viewing device to aim the laser at a specific target as assessed by the x-ray;
- rotating the rotatable bar so that the bomb disarming device is on top in such a way as to align the bomb disarming device to wherever the laser previously pointed;
- activating the bomb disarming device to dispose of the explosive ordnance.

* * * * *